(12) United States Patent  
Espinasse et al.

(10) Patent No.: US 7,793,383 B2
(45) Date of Patent: Sep. 14, 2010

(54) WIPER ARM MADE OF COMPOSITE MATERIAL

(75) Inventors: Philippe Espinasse, Coudes (FR); Jerome Cerdan, Beaulieu (FR); Eric Poton, Pont du Chateau (FR); Guiseppe Grasso, Le Breuil sur Couze (FR)

(73) Assignee: Valeo Systemes d'Essuyage, Le Mesnil-Saint-Denis (FR)

( * ) Notice: Subject to any disclaimer, the term of this patent is extended or adjusted under 35 U.S.C. 154(b) by 324 days.

(21) Appl. No.: 11/994,319

(22) PCT Filed: Jun. 14, 2006

(86) PCT No.: PCT/EP2006/005730

§ 371 (c)(1), (2), (4) Date: May 1, 2008

(87) PCT Pub. No.: WO2007/003261

PCT Pub. Date: Jan. 11, 2007

(65) Prior Publication Data

US 2008/0216276 A1 Sep. 11, 2008

(30) Foreign Application Priority Data

Jun. 29, 2005 (FR) .................................. 05 06634

(51) Int. Cl.
*B60S 1/34* (2006.01)
(52) U.S. Cl. ................................. 15/250.351
(58) Field of Classification Search ............. 15/250.351, 15/250.352, 250.21, 250.23, 250.19, 250.34
See application file for complete search history.

(56) References Cited

U.S. PATENT DOCUMENTS

| 2,613,385 | A | * | 10/1952 | Wylie | 15/250.351 |
| 4,318,201 | A | * | 3/1982 | Rogers et al. | 15/250.352 |
| 6,505,377 | B1 | | 1/2003 | Merkel et al. | |
| 7,225,498 | B2 | * | 6/2007 | Buchanan, Jr. | 15/250.351 |
| 2003/0121119 | A1 | | 7/2003 | Benoit et al. | |

FOREIGN PATENT DOCUMENTS

| EP | 0150753 | 8/1985 |
| EP | 1452412 | 9/2004 |
| FR | 2515121 | 4/1983 |

OTHER PUBLICATIONS

International Search Report issued in PCT/EP2006/005730, mailed on Sep. 15, 2006, 2 pages.

* cited by examiner

*Primary Examiner*—Gary K Graham
(74) *Attorney, Agent, or Firm*—Osha • Liang LLP

(57) ABSTRACT

A windshield wiper arm including a rear end segment fixed to a shaft driving the windshield wiper arm in an alternating wiping movement about the global and vertical axis, a free front segment for supporting a wiper blade, and an intermediate segment with a longitudinal orientation which is at least partly elastically deformable and which links the rear end segment to the free front segment, wherein the intermediate segment includes a longitudinal central web which is covered with an outer sleeve, wherein at least one portion of the longitudinal central web includes a multilayer plate made of globally horizontal superimposed layers of different materials and thickness, and wherein the multilayer plate comprises at least one layer made of a composite material.

11 Claims, 2 Drawing Sheets

WIPER ARM MADE OF COMPOSITE MATERIAL

The invention provides a wiper arm of a windshield wiper comprising:
- a rear end segment which is fixed to a shaft driving the arm in an alternating wiping movement about a globally vertical axis A;
- a free front segment which is adapted to bear a wiper blade; and
- an intermediate segment with longitudinal orientation, which is at least partly elastically deformable and which links the rear segment to the front segment and which comprises the longitudinal central web which is covered with an outer sleeve.

Document FR-A-2.515.121 discloses such a wiper arm wherein the central web is made of a glass fiber-based composite material and wherein the outer sleeve encloses the whole of the central web and is made of a carbon fiber-based composite material.

Such an embodiment of the intermediate segment of the wiper arm from such different composite material makes it possible to increase the stiffness of the arm in torsion about its main longitudinal axis with respect to a conventional arm, the structure of which is made of metal.

According to this document, the outer sleeve which contributes to give the arm its mechanical properties is a part of the arm which is more particularly subjected to external events such as impacts, pollution or ultraviolet rays. Thus, the mechanical proprieties of the outer sleeve are likely to vary over time, thus reducing the efficiency of the wiping of the glass panel.

The aim of the invention is to provide a wiper arm, wherein the external events imposed on the arms have relatively insignificant consequences on the mechanical properties of the arm. Therefore the invention provides a wiper arm of the type described hereabove, characterized in that at least one portion of the central web consists of a multilayer plate made of globally horizontal superimposed layers of different materials and/or thicknesses.

According to other characteristics of the invention:
- the multilayer plate includes at least one layer made of glass- and/or carbon fiber-based composite material;
- the multilayer plate comprises a layer which is made of metal and more particularly made of steel;
- the multilayer plate comprises a layer which is made of a thermosetting material;
- the multilayer plate comprises a part making globally transversal orientated waves;
- a central web comprises a stiff front longitudinal rod which extends globally longitudinally frontwards and extends the multilayer plate frontwards.
- the stiffness of the front rod in flexion in the vertical longitudinal plan is greater than the stiffness of the multilayer plate;
- the rear longitudinal end of the front rod is fitted onto the front end of the multilayer plate;
- the rear segment of the arm and/or the front segment of the arm is made by overmolding plastic material around an associated end of the central web;
- the multilayer plate extends at least partly inside the rear segment of the wiper arm;
- the outer sleeve is made by overmolding plastic material around the central web.

Other characteristics and advantages of the invention will become evident when reading the detailed description which follows for the understanding of which reference will be made to the appended figures wherein.

For the description of the invention, the vertical, longitudinal and transversal orientations will not limitatively be referred to, according to the V, L, T letters mentioned in the Figures.

Figure 2:
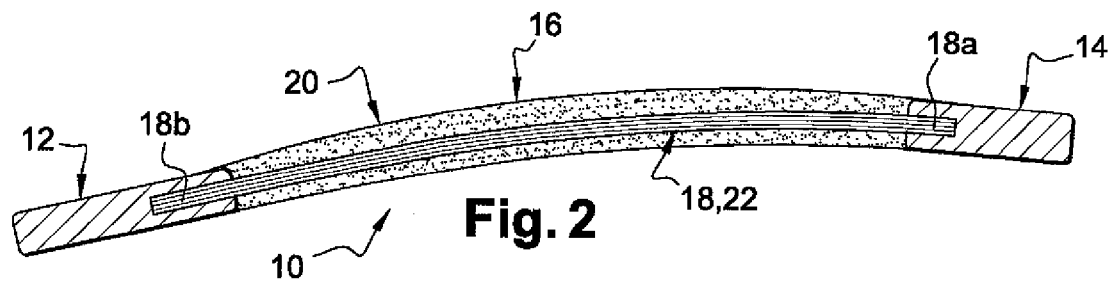
FIG. 2 is an axial section of the arm shown in FIG. 1.

The backwards and frontwards orientations will also be referred to as being the longitudinal left to right direction with reference to FIG. 2.

In the following description identical, similar or analog elements will be referred to using the same reference numbers.

In the Figures is shown a wiper arm 10 for a windshield wiper (not shown) alternately wiping a glass pane (not shown) about a globally vertical axis A.

The arm 10 has a primary longitudinal orientation and it comprises a rear end segment 12 through which the arm 10 is fixed to a shaft driving the wiper 10 into an alternate wiping, about the vertical axis A, a free front end segment 14 which is so arranged as to allow the mounting of the wiper on the arm 10 and an intermediate segment 16 having a main longitudinal orientation which links the rear segment 12 to the front segment 14.

As can be seen in details in FIG. 2, the intermediate segment 16 is made of several parts and it mainly includes a central web 18 which extends globally longitudinally, along the length of the intermediate segment 16 and it also comprises an outer sleeve 20 which covers the whole of the central web 18. The central web 18 is the structural element of the intermediate segment 16 and it is so arranged as to facilitate the deformation of the intermediate segment 16 along a first direction and so as to reduce deformations of the intermediate segments 16 along other directions.

According to the preferred embodiment, the central web 18 is made so as to facilitate the bending of the intermediate segment 16 in a globally longitudinal vertical plan so as to allow a movement of the front segment 14 globally in a vertical way during the wiping movement so as to keep the wiper in contact with the glass pane.

Besides, the central web 18 is so arranged as to limit the deformations of the intermediate segment 16 in torsion about its main longitudinal axis and in flexion in a horizontal plan globally parallel to the glass pane. As a matter of fact, such deformation of the intermediate segment changed the orientation of the wiper arm with respect to the glass pane to be wiped, which reduces the efficiency of the wiping.

The sleeve 20 is made of a neutral material so that it can be deformed elastically similarly in all deformation directions.

The elastic deformations of the sleeve 20 have no influence on the deformations of the web 18 or on the quality of the wiping.

The shape of sleeves 20 is determined as a function of the outer aspect expected for the arm 10. According to a varying embodiment, the sleeve is so arranged in aero-dynamically, so that the movements of air produced when the vehicle moves generate resting efforts of the wiper arm on the glass pane.

Thus, the sleeve 20 protects the central web 18 from the external events which could cause a deterioration of the mechanical proprieties of the central web 18.

Figure 3:
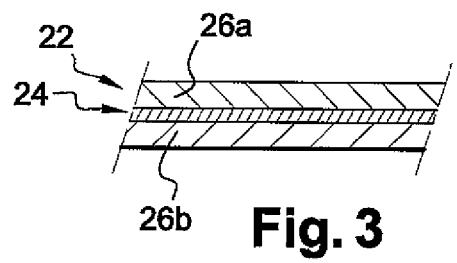
FIG. 3 is a detail on a larger scale of the section shown in FIG. 2 showing the structure of the multilayer plate.

According to the invention and as can be seen in details in FIG. 3, the central web 18 comprises a portion 22 which consists in a globally horizontal superimposed layers of different materials and/or thicknesses. Such portion of the central web 18 thus forms a so-called multilayer plate.

This multilayer plate 22 is formed so that neither the deformation of the intermediate segment 16 in flexion in the vertical longitudinal plan and with a view to limiting the other deformations of the intermediate segment 16, i.e. in flexion in a horizontal plan and in torsion about the main longitudinal axis of the intermediate segment 16.

The various layers of the multilayer plate 22 are preferably made of a for example glass fiber-based or on carbon fiber-based composite material and the orientation of fibers is determined as a function of the multilayer plate deformations which should be facilitated and/or limited.

Thus, for example the fibers of certain layers are oriented parallel to the main longitudinal axis of the intermediate segment 16 and other fibers are inclined by 45 degrees or 90 degrees with respect to the main longitudinal axis of the intermediate segment 16.

According to a varying embodiment of the invention, a central layer of the multilayer plate 22 is made of metal and for instance of steel.

Using steel makes it possible, among other things, to limit the permanent deformations of the intermediate segment due to the creep of the plastic material forming the other layers of the plate 22 which is caused by the stresses that the intermediate segment 16 is exposed to continuously.

According to a varying embodiment, the central layer of the multilayer plate 22 is made of thermosetting material. A thermosetting material is not so responsive to creep as thermoplastic material. According to a varying embodiment, the plate 22 is made so that the various layers are arranged symmetrically with respect to the middle horizontal plane of the plate 22.

As a non-limitative example and as shown in FIG. 3, a multilayer plate 22 comprises a central layer 24 made of steel and two upper 26a and lower 26b layers which are identical and made of a glass fiber-based composite material. It should be easily understood that the invention is not limited to such embodiment and that the multilayer plate 22 can include a different number of layers 24, 26.

Figure 4:
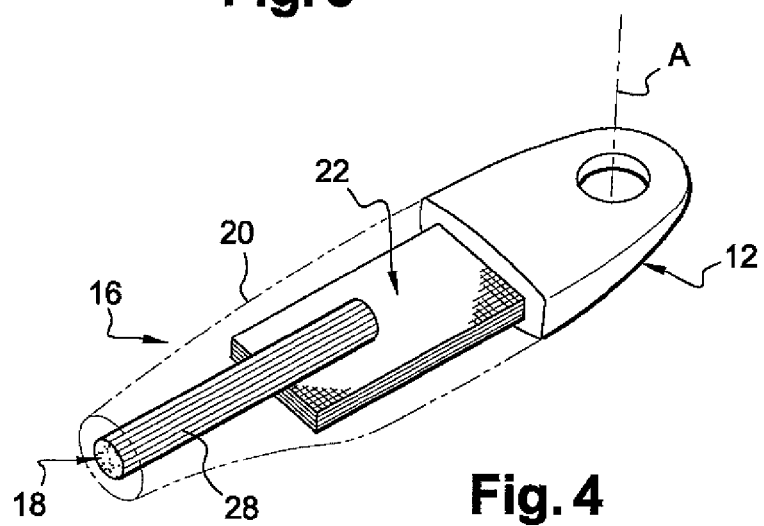
FIG. 4 is a diagrammatic representation with a torn wiper arm as per a varying embodiment of the invention wherein the central web comprises a front rod.

According to a first embodiment of the invention shown in FIG. 4, the central web 18 is made in two portions, the rear portion being formed by the multilayer plate 22 and the front portion by a front longitudinal rod 28 which extends the multilayer plate 22 frontwards.

The front rod 28 is stiffer than the multilayer plate 22 in flexion in the vertical longitudinal plan.

According to the embodiment of the invention shown in FIG. 4, the front rod 28 is fixed to the multilayer plate 22 by means of a sheath 20 which is made by overmolding around the multilayer plate 22 and around the front rod 28.

Figure 5A:
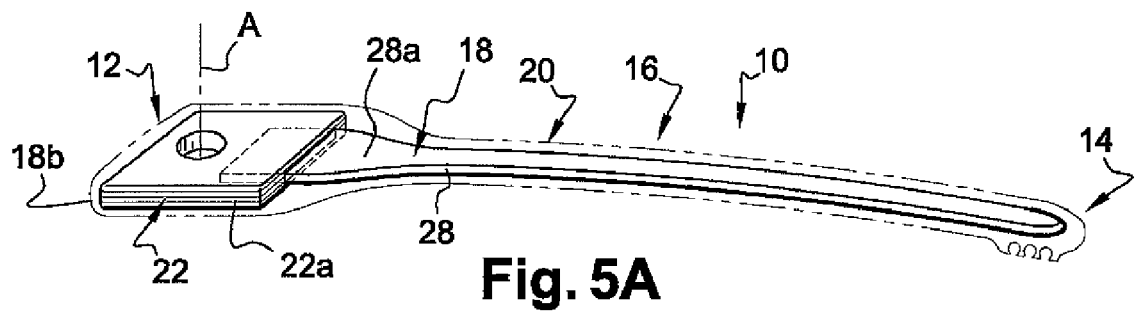
FIGS. 5a and 5b are views similar to that of FIG. 2, showing a varying embodiment of the arm comprising a front rod, showing two different examples of the rod with the multilayer plate.
Figure 5B:
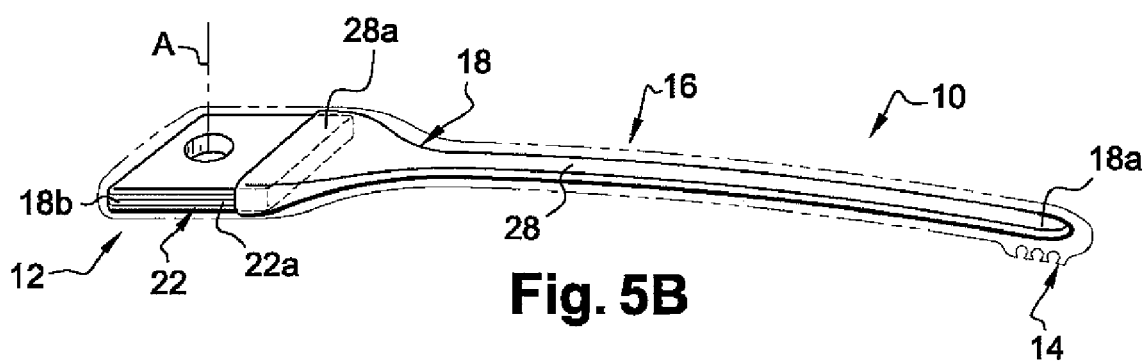

According to a varying embodiment, the front rod 28 is fixed onto the multilayer plate 22 by fitting the rear end 28a of the front rod 28 into the front end 22a of the multilayer plate 22, as shown in FIG. 5a or reversely by fitting the rear end 28a of the front rod 28 around the front end 22a of the multilayer plate 22, as can be seen in FIG. 5b.

Figure 6:
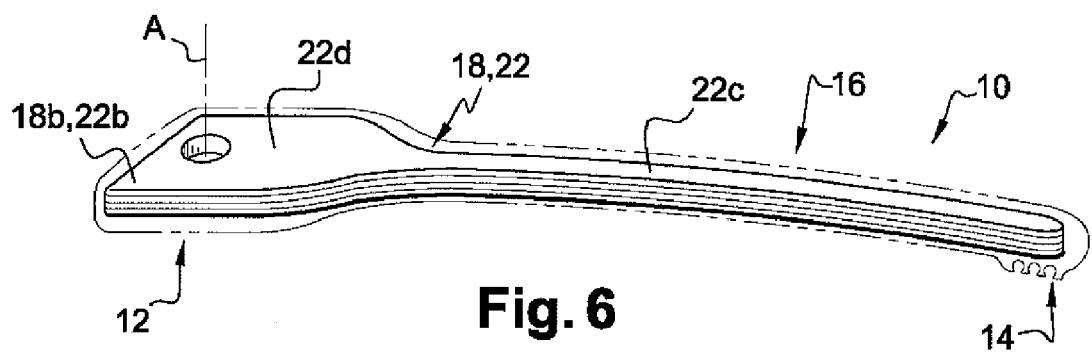
FIG. 6 is a view similar to that of FIG. 2, showing another varying embodiment of the invention wherein the multilayer plate composes the whole of the central web.

According to another embodiment of the invention shown in FIG. 6, the central web 18 is formed only by the multilayer plate 22 which thus links the rear segment 12 of the wiper arm 10 to the front segment 14.

The multilayer plate 22 further comprises a rear part 22d which is relatively large and which is also so arranged as to facilitate some deformations of the front segment 16 as defined hereabove and it further comprises a front part 22c having a reduced width with respect to the rear part 22d.

Figure 7:
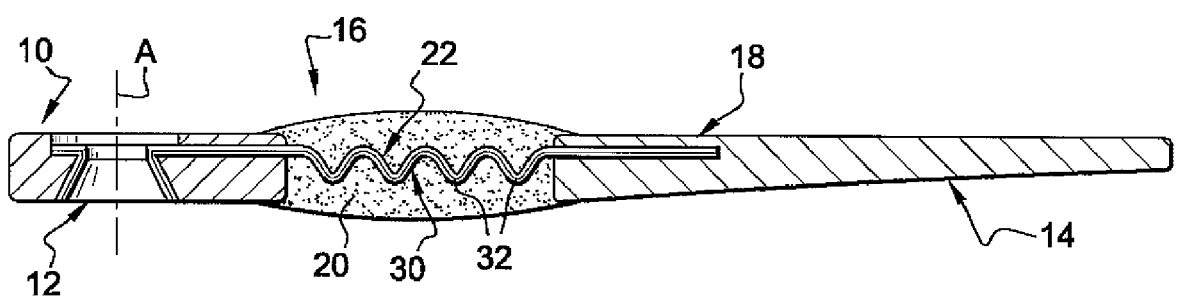
FIG. 7 is a view similar to that of FIG. 2, further showing another varying embodiment of the invention wherein an area of the multilayer plate forms transversal waves.

According to a varying embodiment shown in FIG. 7, the multilayer plate 22 comprises a part 30 forming transversal waves 32 which facilitate the flexion of the intermediate segment 16 in a vertical longitudinal plan.

As mentioned hereabove, the intermediate segment 16 of the wiper arm 10 links the rear segment 12 to the front segment 14. Thus, and as can be more particularly seen in FIG. 2, the front 18a and rear 18b ends of the central web 18 are received in the rear segment 12 and in the front segment 14, respectively.

According to a preferred embodiment, the rear segment 12 and the front segment 14 are made by overmolding the plastic material around the end 18a, 18b associated to the central web 18.

Then, the outer sleeve 20 is made by overmolding around the central web 18 and around the rear segment 12 and the front segment 14 so as to become finally integral with the various components of the arm 10.

In compliance with the invention, the rear end 22b on the multilayer plate 22 forms the rear end 18b of the central web 18. Thus, the rear segment 12 is made by overmolding around the rear end 22b of the multilayer plate 22. According to a varying embodiment shown in FIGS. 5a and 5b, the rear segment 12 is made by overmolding around the whole of the multilayer plate 22.

Figure 1:
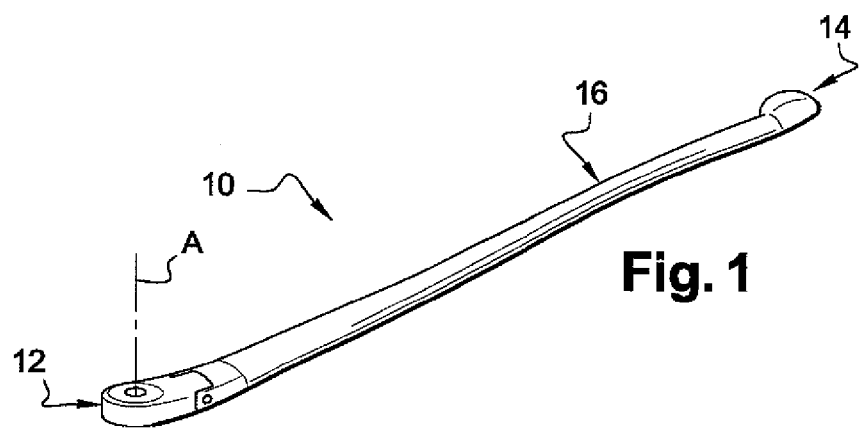
FIG. 1 is a perspective diagrammatic illustration of the wiper arm according to the invention.

The shape of the driving arm 10 shown in FIG. 1 is, generally speaking, specific to a particular type of motor vehicle. On the contrary, the rear segment 12 and the front segment 14 have a conventional shape as regards the fastening of the wiper arm 10 to the driving shaft 10 and to the wiper, respectively.

Thus, it is possible to embody two different arms 10 and to use identical molds to make the front 12 and rear 14 segments of each arm 10, the tooling required for making the central web 18 and the outer sleeve 20 only being specific to the arm 10 to be made.

The invention has been described while referring to a wiper arm, wherein the intermediate segment 16 has a mainly longitudinal orientation.

It should be understood that the invention is not limited to an arm 10 for which the intermediate segment 16 is rectilinear and that it can also apply to a wiper arm for which the intermediate segment is at least partly flexed.

The invention claimed is:

1. A windshield wiper arm comprising:
   a rear end segment which is fixed to a shaft driving the windshield wiper arm in an alternating wiping movement about a global and vertical axis;
   a free front segment configured to support a wiper blade; and
   an intermediate segment with a longitudinal orientation which is at least partly elastically deformable and which links the rear end segment to the free front segment, wherein the intermediate segment comprises a longitudinal central web which is covered with an outer sleeve, and wherein at least one portion of the longitudinal central web consists of a multilayer plate made of globally horizontal superimposed layers of different materials and thickness, and wherein the multilayer plate comprises at least one layer made of a composite material.

2. The windshield wiper arm according to claim 1, wherein the composite material comprises one of glass fibers and carbon fibers.

3. The windshield wiper arm according to claim 1, wherein one of said globally horizontal superimposed layers of the multilayer plate is made of steel.

4. The windshield wiper arm according to claim 1, wherein one of said globally horizontal superimposed layers of said multilayer plate is made of a thermosetting material.

5. The windshield wiper arm according to claim 1, wherein said multilayer plate comprises a part forming waves having a globally transversal orientation.

6. The windshield wiper arm according to claim 1, wherein said longitudinal central web comprises a stiff front longitudinal rod which extends globally longitudinally frontwards and extends the multilayer plate frontwards.

7. The windshield wiper arm according to claim 6, wherein the stiffness of the front longitudinal rod in flexion in a vertical longitudinal plan is greater than a stiffness of the multilayer plate.

8. The windshield wiper arm according to claim 6, wherein a rear longitudinal end of the front longitudinal rod is fitted into a front end of the multilayer plate.

9. The windshield wiper arm according to claim 1, wherein said rear end segment of the windshield wiper arm and the free front segment of the windshield wiper arm is made by overmolding plastic material around an associated end of the longitudinal central web.

10. The windshield wiper arm according to claim 1, wherein said multilayer plate extends at least partly inside the rear end segment of the windshield wiper arm.

11. The windshield wiper arm according to claim 1, wherein said outer sleeve is made by overmolding plastic material around the longitudinal central web.

* * * * *